Dec. 27, 1966  G. A. VANDERHEYDEN  3,293,917
PRESSURE GAUGE CASING
Filed May 11, 1964
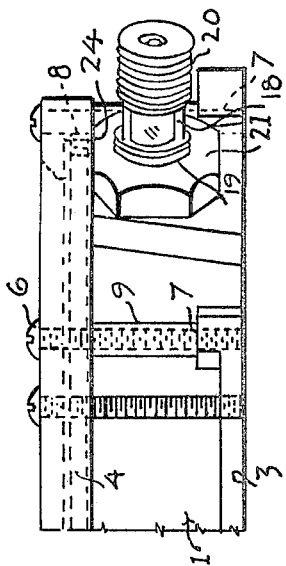
INVENTOR.
GEORGE ALBERT VANDERHEYDEN
BY
Edward Emerby Bishop

United States Patent Office 3,293,917
Patented Dec. 27, 1966

3,293,917
PRESSURE GAUGE CASING
George Albert Vanderheyden, Edmonton, Alberta, Canada, assignor to C.P.W. Valve & Instrument Ltd.
Filed May 11, 1964, Ser. No. 366,379
4 Claims. (Cl. 73—418)

This invention relates to pressure responsive gauges and particularly to gauges of this type filled with an inert fluid for anti-corrosive, damping and lubrication purposes.

Pressure responsive gauges of the type employing a Bourdon tube within a casing with the Bourdon tube coupled to an indicating movement, are used widely to indicate steam and air pressures.

In many instances these gauges are used in highly corrosive atmosphere and in locations where severe vibration is present and, as a result, it has become the practise to fill these gauges with an inert fluid that will act as a damper for extreme vibrations, that will lubricate the moving parts of the indicating mechanism and that will serve as an anti-corrosive medium in which the more delicate mechanisms of the gauge may operate.

My invention relates to gauges of this type and the essence of my invention is to provide a gauge wherein the pressure responsive mechanism and the indicating movement of the device are mounted on a socket and wherein the socket is secured by a simple nut fastening means so that the socket may be attached or detached from the casing quickly and easily. Further, the transparent cover for my casing is adapted to engage with the nut fastening means when the device is assembled to prevent the nut fastening means from being loosened unless the cover is removed. In addition, I have provided a simple deformable sleeve means associated with the fastening screws for the cover whereby the screws will be held against turning while the gauge is in operation under severe vibration.

Additional advantages of my device will be seen when the following specification is read in the light of the attached drawings.

In the drawings:

FIGURE 1 is a plan view of a gauge constructed in accordance with my invention with the casing partly broken away to illustrate the position of the socket in the casing.

FIGURE 2 is a sectional side elevation of the casing taken approximately along the line A—A of FIGURE 1, without the socket and actuating mechanism sectionalized and showing a sectional side view of a cover as would be taken approximately at the same line A—A.

FIGURE 3 is a broken away side view illustrating the projection of the socket stem through the casing and the interaction of the cover and the attaching nut and also illustrating the securement of the cover to the casing with the deformable spacers.

FIGURE 4 is a sectional side view showing one of the cover attaching screws and deformable spacers.

As seen in the drawings the casing indicated generally at 1 is a cylindrical form with an integral closed bottom 2 which is enlarged into a peripheral flange extending around the casing. The casing is open at its top and a cover consisting of a ring 4 and transparent face piece 5 is secured on the casing 1 through a plurality of fastening screws 6 which extend through openings in the ring 4 to engage in aligned openings 7 in the ring 3. To effect a fluid tight seal between the cover and the casing 1 I have provided gasket material 8 which engages over the lip of the casing and is compressed as the cover is tightened.

I have further provided deformable spacers 9 which encircle each of the fastening screws 6 and which are of sufficient length to engage at their one end with the flange 3 and at their opposite end with the ring 4 of the cover so that they will be placed under longitudinal stress as the cover is tightened on the casing. The sleeves 9 are preferably formed of plastic or the like so that the longitudinal stress will deform the walls of the sleeve slightly and cause the sleeves to grip tightly on the threads 10 of the fastening screws 6 and thereby prevent the fastening screws from loosening if the gauge assembly is under vibration.

The casing is formed with an opening and preferably diametrically opposite in the casing an additional opening 12 is formed which is fitted with a resilient plug 13 which may be rubber, plastic, or the like.

An indicating mechanism for the gauge which includes a Bourdon tube 14 coupled to indicating movement 15 and pointer 16 is mounted rigidly on the socket 17. The socket 17 is formed with a stem 18 preferably threaded externally as indicated at 19 and 20.

The stem 18 projects through the opening 11 when the indicating assembly is correctly positioned in the casing and a nut 21 is engaged on the threads 19 to secure the indicating assembly rigidly in the casing. To ensure a fluid tight seal at the opening 11 a resilient washer 22 encircles the stem and is compressed between the socket and the casing as the nut 21 is tightened.

When the nut 21 is tightened to secure the socket in place, the nut 21 is prevented from further movement by the ring 4 of the cover which engages with the nut 21, as indicated at 24, when the cover is secured in place on the casing 1. In the preferred embodiment illustrated, the socket 17 is prevented from turning in the casing by the shoulders 23 in the casing which engage with the sides of the socket 17.

In operation the device is assembled by firstly inserting the stem 18 of the socket 17 through the opening 11 and when the socket 17 is correctly positioned between the shoulders 23 in the casing, the nut 21 is tightened to deform the resilient washer 22 and effect a fluid tight seal at the opening 11. The nut 21 is tightened so that one of the edges of the nut is parallel with the open edge of the casing 1 and the cover is then fitted over the casing and secured by the fastening screws 6. It should be noted that the fastening screws 6 are tightened down until the ring 4 engages on one end of the deformable spacers 9 and places the spacers under tension to lock against the threads 10 of the fastening screws. At this point, the ring 24 will have engaged against the edge of the nut 21 as indicated at 24 to lock the nut 21 against movement.

The casing 1 then may be fitted with an inert fluid medium through the opening 12 and when the casing is full the plug 13 is fitted in the opening to seal the inert fluid medium in the casing. The threads 20 on the stem 18 then may be connected into the pressure line or vessel desired and pressure through the stem 18 acting on the Bourdon tube will then actuate the pointer 16 and will indicate on an appropriate dial either imprinted on the transparent face or included within the instrument.

If it is desired to disassemble the instrument for servicing or calibrating, it is only necessary to remove the plug 13, drain out the inert fluid medium, remove the cover, release the nut 21 whereupon it is a simple matter to move the socket 17 and the indicating mechanism as illustrated in FIGURE 2 in the drawings.

What I claim as my invention is:

1. In a pressure gauge, a casing, an opening through the side of the casing, a socket having an externally threaded stem, such socket mounted in the casing with the stem projecting through the opening, gasket material positioned between the socket and the casing, a nut engaged on the threads externally of the casing to bear against the casing and secure the socket in fluid tight engagement in the casing, a pressure responsive element and indicating mechanism mounted on the socket within the casing, a transparent cover secured removably on the casing, such cover having fluid tight seal with the casing and arranged to engage with the nut to prevent the nut from turning.

2. The gauge as claimed in claim 1 and means to prevent the socket from rotating in the casing.

3. The gauge as claimed in claim 2 wherein the means to prevent the socket from rotating comprises internal shoulders in the casing positioned to engage with the sides of the socket.

4. In a pressure gauge, a casing, an opening through the side of the casing, a socket having a stem, such socket mounted in the casing with the stem projecting through the opening, gasket material positioned between the socket and the casing, means engaged on the stem outside the casing to secure the socket in fluid tight engagement with the casing, a transparent cover and means to secure the cover in fluid tight engagement with the casing comprising a plurality of fastening screws engaged threadably with the cover to pass through the cover into engagement with the casing and including deformable sleeve spaces encircling the screws to engage at their ends with the casing and the cover and to be deformed when the cover is tightened into fluid tight engagement with the casing and hold the screws against turning and means to inject an inert fluid into the casing.

References Cited by the Examiner

UNITED STATES PATENTS

| | | | |
|---|---|---|---|
| 3,080,758 | 3/1963 | Decker | 73—392 X |
| 3,204,472 | 9/1965 | Gorgens et al. | 73—411 |

LOUIS R. PRINCE, *Primary Examiner.*

DONALD O. WOODIEL, *Assistant Examiner.*